United States Patent Office 2,873,277
Patented Feb. 10, 1959

2,873,277

MANUFACTURE OF N-ALKYL- AND N-CYCLOAL-KYLBIS (2-BENZOTHIAZOLESULFEN) AMIDES

Norman K. Sundholm, Naugatuck, Conn., assignor to United States Rubber Company, New York, N. Y., a corporation of New Jersey No Drawing. Application September 28, 1956
Serial No. 612,589

6 Claims. (Cl. 260—306.6)

This invention relates to a method for the preparation of N-alkyl- and N-cycloalkylbis(2-bonzothiazolesulfen)-amides. These compounds are useful as accelerators for the vulcanization of rubber or other vulcanizable rubber-like substances. Further, they have the useful property of showing good resistance to scorch, that is, they have little tendency to cause incipient vulcanization of conventional rubber stocks during processing.

These compounds can be prepared by the reaction of 2-benzothiazolesulfenyl chloride with the appropriate primary amine in the presence of a suitable base according to the equation

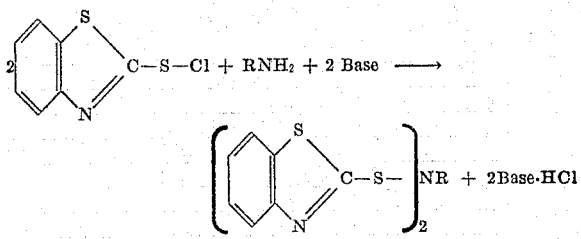

R in the above equation is a member of the group consisting of alkyl and cycloalkyl radicals.

The quality of the products obtained by the application of this reaction varies considerably with the base used and the conditions under which the reaction is carried out. When aqueous sodium hydroxide or an aliphatic tertiary amine is used as the base and the reaction carried out by adding a solution of 2-benzothiazolesulfenyl chloride in a suitable solvent to the mixture of primary amine and base, the products are quite impure.

When sufficient primary amine is used it can serve as the base in the reaction; the equation then becomes

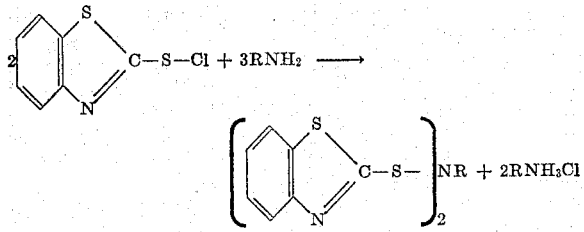

It has been found that this reaction is extremely sensitive to the conditions used. Variations in the reaction temperature, the order of mixing of the reactants, the mixing time, etc., have effect on the amounts of undesirable by-products, such as benzothiazolyl disulfide, formed. The presence of the by-products results in a decrease in the scorch resistance of the materials obtained and lessens their usefulness as delayed action accelerators.

The purpose of this invention is to provide conditions for carrying out this reaction so as to give the bis(2-benzothiazolesulfen)amides with minimum contamination by other products.

It has now been discovered that good quality N-alkyl- and N-cycloalkylbis(2-benzothiazolesulfen)amides can be prepared by the substantially concurrent addition of the corresponding monoalkyl- or monocycloalkylamine and 2-benzothiazolesulfenyl chloride to a reaction zone in approximately a 3:2 molar ratio, respectively. These findings make it possible, without limitation thereto, to carry out the reaction on a commercial scale at a temperature above about 0° C., and preferably below about 50° C., employing any desired mixing time for the two reactants. A certain amount of latitude is permissible in allowing one of the reactants to be slightly ahead of the other in the mixing process without affecting the quality of the product markedly.

The 2-benzothiazolesulfenyl chloride may be used as a solution or suspension in a suitable organic liquid; the sulfenyl chloride can be formed by the chlorination of a suspension of benzothiazolyl disulfide in the liquid according to W. E. Messer, U. S. Patent No. 2,257,974, dated October 7, 1941. Examples of organic liquids which may be used are n-hexane, methylene chloride, ethylene chloride, carbon tetrachloride, benzene, toluene, and chlorobenzene.

The amines, whether they are gases, liquids, or solids under ordinary conditions, may be used as such or in solution in a suitable organic liquid. This liquid preferably should be the same as that used in the preparation of the sulfenyl chloride, since its recovery in commercial operation would be expedient.

While the substantially concurrent addition to the reaction zone may be carried out as a batch process, this invention permits the carrying out of the reaction as a continuous process. The two reactants may be added concurrently to a relatively small reaction zone from which the mixture may flow to the equipment used to recover the product.

Experiments have shown that using approximately a two-hour addition time and a temperature of about 25° C., the products obtained by the concurrent addition method are markedly superior in quality to those obtained by adding the amine to the sulfenyl chloride and vice versa. Two tests which have been used to determine the quality of the products in a rough manner are the melting point test and the Mooney scorch test.

It has been observed that a mixture of a bis(2-benzothiazolesulfen)amide and greater than about five percent of benzothiazolyl disulfide melt over a range which extends above the melting point of the pure amide. The greater the proportion of the disulfide, the higher the clearing point of the mixture. All pure N-alkyl- and N-cycloalkylbis(2-benzothiazolesulfen)amides prepared have melting points below that of the disulfide.

In the well-known Mooney scorch test as run on the Mooney viscometer the more scorch resistance exhibited by an accelerator incorporated into a rubber stock, the longer the scorch time of the stock. Contamination of the accelerator with one or more accelerators having less scorch resistance results in a reduction of the scorch time of the stock. On the basis of the scorch times of the rubber stocks containing as accelerators the products obtained demonstrating the usefulness of the concurrent addition method, a comparison of their quality can be made.

The following examples are presented to illustrate this invention.

*Example 1.—Preparation of N-isopropylbis(2-benzothiazolesulfen)amide*

A. By the concurrent addition method as a batch process: A solution of 2-benzothiazolesulfenyl chloride was prepared by the treatment of a stirred suspension of 66.4 grams of benzothiazolyl disulfide in 500 ml. of anhydrous benzene with 14.2 grams of chlorine. This solution and a solution of 35.4 grams of isopropylamine in 100 ml. of anhydrous benzene were added concurrently to a flask equipped with a stirrer, two dropping funnels, and a thermometer. The rates of addition of the two solutions were adjusted so that they were both added during a two-hour period; the rates were kept as constant as possible. The temperature of the reaction mixture was kept at 23–26° C. during the mixing. After stirring for one-half hour, the mixture was filtered and the isopropylamine hydrochloride washed with two 100-ml. portions of benzene. The wash was added to the filtrate and the benzene removed. The product consisted of 76.1 grams (98% of theory) of pale pink solid melting at 97–102° C. When pure this compound melts at 106–107° C. Ligroin (B. P. 60–90° C.) can be used as a recrystallization solvent for the bis(2-benzothiazolesulfen)amides.

B. By the concurrent addition method as a continuous process: This reaction was carried out in a three-necked 500-ml. flask provided with a sidearm takeoff attached about 1½ inches below one of the side necks. The procedure was the same as that used in Example 1–A as to the amounts of reactants and solvent, addition time, and addition temperature. The reaction mixture began to overflow through the sidearm into a beaker when about 175 ml. of solutions had been added. After the addition of the sulfenyl chloride and amine was complete, the mixture in the flask was stirred for one-half hour and combined with that in the beaker. This was worked up as in Example 1–A to give 75.4 grams 97% of theory) of pale pink solid melting at 98–102° C.

C. By the addition of isopropylamine to the sulfenyl chloride: A solution of isopropylamine made up as in Example 1–A was added during two hours to a stirred solution of 2-benzothiazolesulfenyl chloride prepared as in Example 1–A. The temperature of the reaction mixture was kept at 24–26° C. during the addition. After stirring for one-half hour, the mixture was worked up as in Example 1–A. Benzothiazolyl disulfide 8.2 grams) was recovered from the isopropylamine hydrochloride residue by washing with water. It was added to the product obtained from the benezene. The combined product consisted of 76.5 grams (98% of theory) of tan solid melting at 88–130° C.

D. By the addition of the sulfenyl chloride to isopropylamine: A solution of 2-benzothiazolesulfenyl chloride prepared as in Example 1–A was added during two hours to a stirred solution of isopropylamine made up as in Example 1–A. The temperature of the reaction mixture was kept at 24–26° C. during the addition. After stirring for one-half hour, the mixture was worked up as in Example 1–A to give 77.3 grams (99% of theory) of beige solid melting at 98–145° C.

*Example 2.—Preparation of N-tert-butylbis(2-benzothiazolesulfen)amide*

The procedure was the same as that used in Example 1–A substituting 43.8 grams of tert-butylamine for the isopropylamine. The product consisted of 78.1 grams (97% of theory) of ivory solid, melting at 136–139° C. When pure this compound melts at 143–144° C.

*Example 3. Preparation of N-cyclohexylbis(2-benzothiazolesulfen)amide*

The procedure was the same as that used in Example 1–A substituting 59.4 grams of cyclohexylamine for the isopropylamine. The product consisted of 84 grams (98% of theory) of colorless solid melting at 123–129° C. When pure this compounds melts at 133–134° C.

*Example 4.—Preparation of N-methylbis(2-benzothiazolesulfen)amide*

A solution of 2-benzothiazolesulfenyl chloride prepared as in Example 1–A and 18.6 grams of methylamine were added concurrently during two hours to 200 ml. of stirred anhydrous benzene. The methylamine was added as a gas below the surface of the benzene. The temperature of the reaction mixture was kept at 24–26° C. during the mixing. After stirring for one-half hour, the mixture was worked up as in Example 1–A to give 71 grams (98% of theory) of tan solid melting at 101–106° C. When pure this compound melts at 110° C.

*Example 5.—Prepartion of N-ethylbis(2-benzothiazolesulfen)amide*

The procedure was the same as that used in Example 4 substituting 27 grams of ethylamine for the methylamine. The product consisted of 73.8 grams (98% of theory) of light pink solid melting at 87–89° C. When pure this compound melts at 92° C.

These products and the purified bis(2-benzothiazolesulfen)amides were tested for scorch resistance on the Mooney viscometer at 250° F. in the following formula:

| | Parts by weight |
|---|---|
| Smoked sheet | 100 |
| Furnace black | 45 |
| Zinc oxide | 5 |
| Zinc salt of cocoanut oil acids | 3.5 |
| Pine tar | 3.5 |
| Antioxidant | 2.0 |
| Sulfur | 2.25 |
| Accelerator | 0.5 |

On the basis of the scorch times of the stocks, the products were rated for percent of scorch resistance as related to the corresponding pure bis(2-benzothiazolesulfen)amide. These ratings are given in the following table:

| Example: | Rating (percent) |
|---|---|
| 1–A | 96 |
| 1–B | 92 |
| 1–C | 74 |
| 1–D | 83 |
| 2 | 97 |
| 3 | 95 |
| 4 | 94 |
| 5 | 97 |

These data show the good quality of the bis(2-benzothiazolesulfen)amides obtained using the concurrent addition method. In the case of the isopropyl derivative the products obtained by this method are shown to have markedly superior quality over those obtained by addition of the amine to the sulfenyl chloride (Example 1–C) and by addition of the sulfenyl chloride to the amine (Example 1–D). The broad melting ranges of the products in these latter examples are further demonstration of their poor quality.

Having thus described my invention, what I claim and desire to protect by Letters Patent is:

1. A method of preparing N-alkyl- and N-cycloalkyl-bis(2-benzothiazolesulfen) amides which comprises the substantially concurrent addition to a reaction zone of a member of the group consisting of the corresponding monoalkylamine and monocycloalkylamine, and 2-benzothiazolesulfenyl chloride in approximately a 3:2 molar ratio, respectively, and carrying out the reaction in the presence of an inert organic solvent.

2. A method as set forth in claim 1 in which the amine is monomethylamine.

3. A method as set forth in claim 1 in which the amine is monoisopropylamine.

4. A method as set forth in claim 1 in which the amine is mono-tert.-butylamine.

5. A method as set forth in claim 1 in which the amine is monocyclohexylamine.

6. A method of preparing N-alkyl- and N-cycloalkyl-bis(2-benzothiazolesulfen)amides which comprises the substantially concurrent addition to a reaction zone of a member of the group consisting of the coresponding monoalkylamine and monocycloalkylamine, and 2-benzothiazolesulfenyl chloride in approximately a 3:2 molar ratio, respectively, the reaction being carried out between about 0° C. and about 50° C. in the presence of an inert organic solvent.

References Cited in the file of this patent

UNITED STATES PATENTS

| | | |
|---|---|---|
| 2,271,834 | Carr | Feb. 3, 1942 |
| 2,321,305 | Messer | June 8, 1943 |
| 2,321,306 | Messer | June 8, 1943 |
| 2,343,538 | Ebelke | Mar. 7, 1944 |

OTHER REFERENCES

Carr et al.: J. Org. Chem., vol. 14, pp. 921–2 (1949).